UNITED STATES PATENT OFFICE.

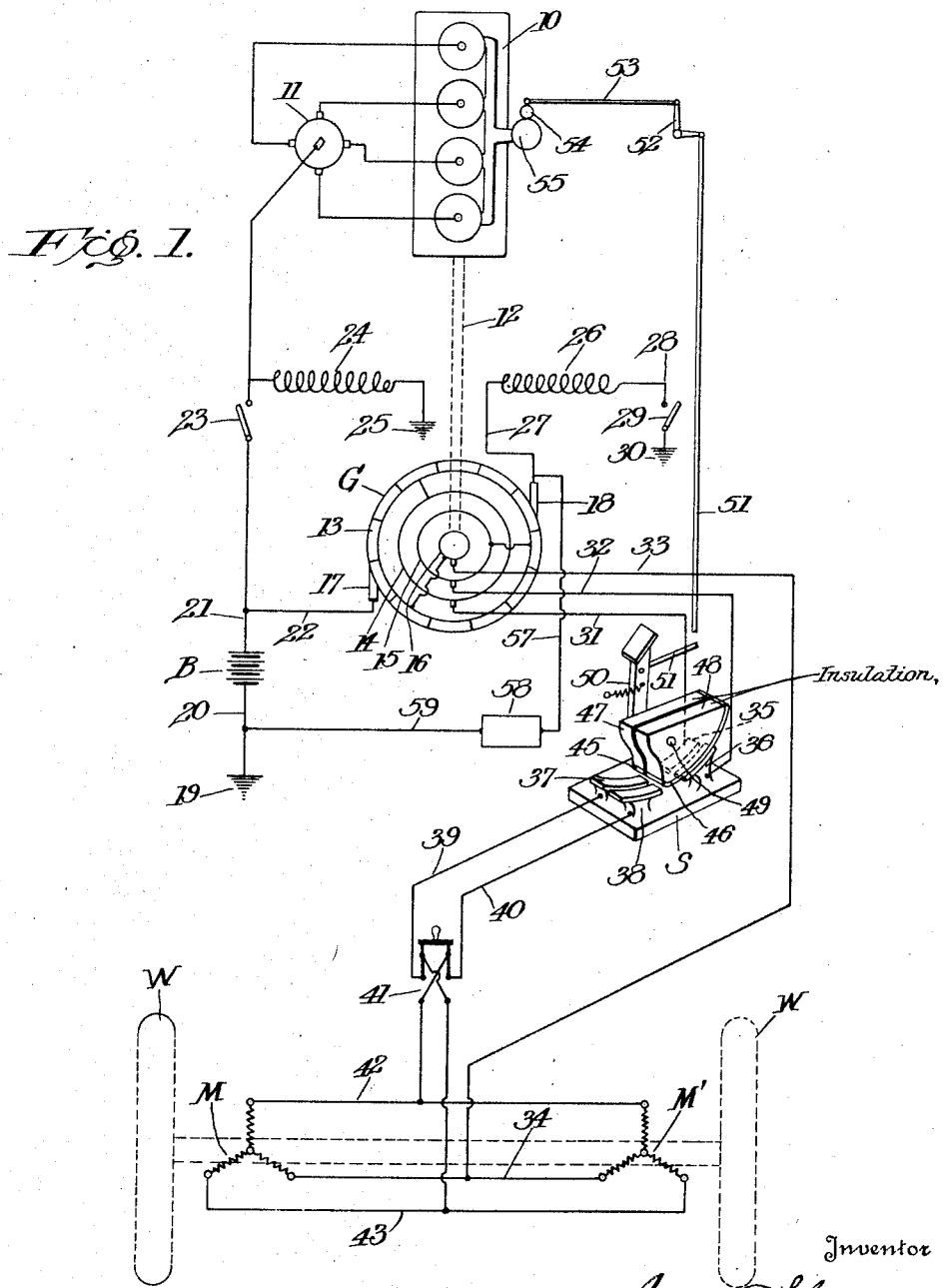

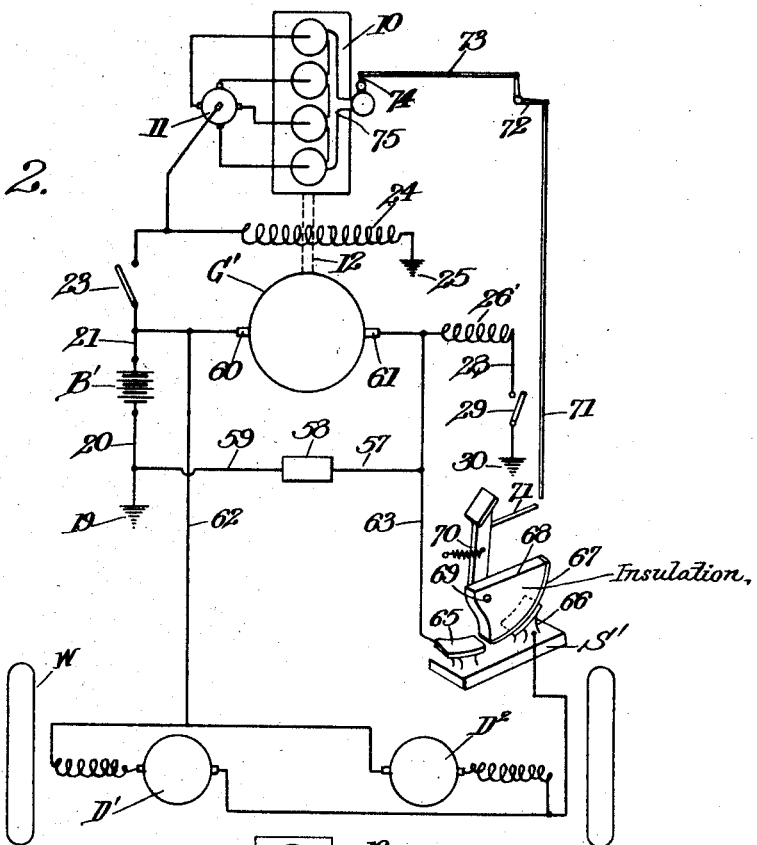
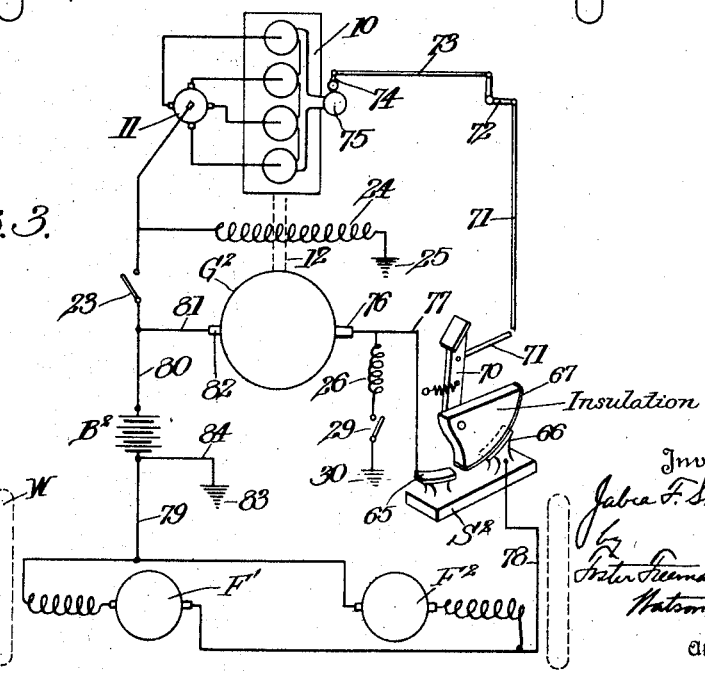

JABEA F. SHAWHAN, OF DAYTON, OHIO.

MOTOR-VEHICLE.

1,387,076.   Specification of Letters Patent.   Patented Aug. 9, 1921.

Application filed January 19, 1917. Serial No. 143,303.

*To all whom it may concern:*

Be it known that I, JABEA F. SHAWHAN, a citizen of the United States, and resident of Dayton, Montgomery county, State of Ohio, have invented certain new and useful Improvements in Motor-Vehicles, of which the following is a specification.

My invention relates to motor vehicles and particularly to an electric motor vehicle in which the electric driving motor or motors of the vehicle are supplied with power from an electric machine driven by a prime mover, such as an internal combustion engine, the electric machine being capable of operating as an electric motor to start the engine.

The principal object of my invention is to produce an electric driven motor vehicle that can be operated easily and which will be able to take up the load of starting and propelling the same from rest without undue strain upon the prime mover and other parts of the apparatus as is produced by suddenly short-circuiting the armature and field circuit of the generator when it is called upon to furnish current for the working circuit. I accomplish this object and produce an electric motor driven vehicle by providing the electric generator thereon with a separately excited field winding, which will make the electro-motive force supplied to the working circuit directly proportional to the speed of the prime mover. When a separately excited generator is used, the current supplied to the field circuit is entirely independent of the load, and the working current or electro-motive force is varied by controlling the speed of the engine, as by throttling the same, the electric generator driven by the engine may be regulated so that the power is gradually supplied to the working circuit until the power is sufficient to pick up the load without a jerk. This method of gradually increasing the electro-motive force and picking up the load eliminates the heavy strain on the engine, generator and other parts of the driving mechanism, and is particularly important in heavy duty gasolene-electric trucks for which the invention has been found to be well adapted.

Another object of the invention is to provide a drive for motor vehicles in which one or more alternating current motors are used to drive the wheels of the vehicle. The advantage of this type of driving motors is that much of the trouble with the motors is eliminated because there are no commutators or brushes as in direct current motors. Since the motors will require much less attention they may be completely inclosed within casings at the wheels or within the wheels themselves.

Other objects and the novel features of the invention will be apparent from the following description taken in connection with the drawings, which constitute a part of the application and in which, Figure 1 is a diagram of a system embodying my invention, part of the switch mechanism being shown in perspective to more clearly disclose the same;

Fig. 2 is a diagram of another system embodying my invention, showing the use of direct current motors for driving the vehicle instead of alternating current motors; and Fig. 3 is a diagram of another system embodying my invention, showing the storage battery connected in series with the working circuit.

Referring to Fig. 1, 10 designates the prime mover of the motor vehicle driving mechanism embodying my invention and is here shown as an internal combustion engine but it is to be understood that other suitable prime movers may be substituted for the engine shown. The ignition of the engine is supplied from a suitable igniting device 11, the terminals of which are connected to the cylinders of the engine to fire the same in the proper order. The engine has a crank shaft 12 which is mechanically connected to a double-current generator G. This double-current generator may be made to deliver both direct and alternating current and may also be run as a motor to start the engine 10. The direct current winding of the machine G is connected to commutator bars 13 and the alternating current winding is connected to three slip rings 14, 15 and 16.

The brushes 17 and 18 bear against opposite sides of the commutator 13 and serve to feed direct current from the storage battery B to the direct current winding of the machine G to operate the same as a motor and to take the direct current when the winding supplies direct current to the battery B to charge the latter. One side of the battery B is grounded as at 19 to the frame of the vehicle through the wire 20 and the other side of the battery is connected to the brush 17 by the wires 21 and 22.

The storage battery B is also connected through the wire 21 and switch 23 to a field winding 24 which is grounded on the vehicle frame at 25. The field winding 24 is designed to set up a constant field flux for the electric machine G so that the voltage of the current supplied by the machine G to its working circuit will be entirely independent of the load on the working circuit but proportional to the speed of the engine driving the machine G as a generator. It has been pointed out heretofore that by providing a separately excited field winding, such as the winding 24, the generator G can be gradually loaded by speeding up the engine which drives it. This is not possible when shunt or compound wound machines are used as generators because the load on the working circuit in the latter type of machines will so suddenly build up the field of the generator supplying current to the working circuit that the engine will either slow down rapidly or come to a complete stop by reason of the fact that it becomes overloaded before the throttle of the engine can be opened by the operator.

The starting circuit of the electric machine G includes a series field coil 26 which is connected by the wire 27 to the commutator brush 18 and by the wire 28 to one terminal of the starting switch 29, the other terminal of the latter being grounded on the vehicle frame at 30.

The alternating current side of the electric machine G is the same as that of a three-phase generator and brushes on the collector rings 14, 15, 16 deliver current to the working circuit of the machine consisting of the three wires 31, 32 and 33 when the electric machine G is being driven as a generator. The wire 33 is connected directly to a wire 34 and the wires 31 and 32 lead to the terminals 35 and 36 of a switch S. The other terminals or poles 37 and 38 of the switch S are connected by the wires 39 and 40 through a reversing switch 41 to the wires 42 and 43. The wires 34, 42 and 43 lead to the motor windings M and M'. The windings M and M' may either be the stator or rotor windings of three-phase motors, the rotating parts of which are connected directly to the driving wheels W and W' of the motor vehicle. The motors M and M' may be entirely inclosed since they have no commutators which will become out of order and are superior to the direct current motors in truck service because they will require much less attention and repairs than direct current motors.

The switch members which control the flow of current in the working circuit consist of segmental plates 45 and 46 secured to the curved faces of the segmental insulating blocks 47 and 48 which are insulated from each other and fixed on a rock shaft 49. The rock shaft 49 is provided with a foot lever 50 located in the usual position at the front end of the floor of the motor vehicle body where it is accessible for manipulation by the driver. The foot lever 50 has a rod 51 (part being broken out) connected to it which is connected by a bell crank lever 52 and link 53 to the throttle valve 54 at the intake 55 of the engine 10. The purpose of the arrangement of the switch S and foot lever 50 with connected parts is to vary the speed of the engine by throttling the intake without interfering with the supply of current to the motor or motors driving the wheels. It will be understood that when the foot lever 50 is pushed forward the switch members 45 and 46 move with it and will continue to make the circuit between the contacts of the switch while the pedal is being moved backward and forward through a wide range of positions, varying the intake of the engine and consequently varying the speed of the same and the speed of the electric machine G.

When the electric machine G is being driven by the engine 10 as a generator it will supply direct current from the brush 18 to the storage battery B through the wire 57, automatic cut-out 58 and wire 59, since the other side of the battery is connected to the brush 17. The charging current will flow to the battery B from the generator G until the potential of the battery exceeds that of the generator whereupon the automatic cut-out 58 will open the charging circuit. The automatic cut-out 58 will also open the charging circuit between the battery B and the generator G when the latter is idle so that the battery will not discharge itself through the generator winding.

Fig. 2 is a diagram of a system similar to that shown in Fig. 1 but in Fig. 2 the electric machine G' is a direct current machine capable of being supplied with current from the battery B' to operate the machine G' as a motor to start the engine 10. The machine G' is also capable of being driven by the engine 10 through the mechanical connection 12 to operate the electric machine G' as a direct current generator to supply current through the brushes 60 and 61 to the working circuit consisting of the wires 62 and 63.

The battery B' supplies current through the wire 21 and switch 23 to the field winding 24 of the machine G' and also supplies current to the distributing device 11 of the engine ignition system, in the same manner as described for the system shown in Fig. 1. The electric machine G' is therefore provided with a field winding in which a constant field flux is set up and it will be understood that this field flux is entirely independent of the load on the working circuit of the machine G' when the same is operating as a generator. The wire 63 is connected to one terminal of the battery by the wire 57, automatic cut-out 58 and wire 59, so that the battery B' may be kept charged while the electric machine G' is running as a generator, the action of the automatic cut-out 58 having already been described. The driving motors D' and D² are connected with the working circuit to receive power therefrom by means of a wire 64 and a switch S', the wires 63 and 64 terminating in contacts 65 and 66 of the switch S'. The device for connecting the contacts 65 and 66 consists of a segmental metal contact plate 67 carried on the curved face of the segmental insulating body 68 mounted on a rock shaft 69. The switch member 67 is swung on the rock shaft 69 by means of a foot lever 70 attached to the member 68 and when the circuit is once closed by the forward movement of the lever 70 the contact face 67 will keep the circuit between the contacts 65 and 66 closed throughout a wide range of movements of the lever 70. This particular arrangement of switching device is necessary in order to keep the working circuit between the generator G' and motors closed while the speed of the engine 10 is being varied within wide limits. The speed of the engine may be varied in a number of well known ways, and I have here shown an arrangement whereby the operator of the vehicle may throttle the engine to increase or decrease its speed. The throttling device consists of a rod 71, partly broken out, connected by a bell crank 72 and rod 73 to the throttle valve 74 at the intake 75 of the engine. When the foot lever is released it is automatically restored to its initial position by a spring and the circuit of the driving motor or motors is simultaneously opened.

I have shown motors D' and D² connected to the working circuit 62 and 63 of the electric machine G', to drive the two rear wheels, thus eliminating differential gearing, but it will be understood that these wheels may be driven by a single motor through differential gearing, or all four wheels may be driven by separate motors.

The motors D' and D² are direct current motors having their rotating armatures connected directly to the wheels or geared to them by internal gearing as is well understood by those skilled in the motor vehicle art. (Not shown).

In Fig. 3 I have shown still another system embodying my invention. This system is in particular a modification of the system shown in Fig. 2. The battery B² of the system shown in Fig. 3 is connected directly in series with the working circuit and the battery is thereby continuously kept charged while the electric machine G² is running as a generator, thus eliminating the wires 57 and 59 and the automatic cut-out 58 used in the systems shown in Figs. 1 and 2. In the system shown in Fig. 3 the electric machine G² when working as a generator supplies current from the brush 76 through the wire 77 to the switch S² which is similar in all respects to the switch S' shown in the system of Fig. 2. The wire 78 leads from the switch S² to the motors F' and F² which are connected to the drive wheels of the vehicle in the manner heretofore described. The motors F' and F² are also connected to one side of the battery B² by a wire 79 and the other side of the battery B² is connected by the wires 80 and 81 to the other brush 82 of the electric machine G². Current flowing through the working circuit from the electric machine G² to the motors F', F² will also flow through the battery B² and keep the same charged. The battery B² is grounded to the vehicle frame at 83 by the wire 84. The battery B² also supplies current to a field winding 24 through the wire 80 and switch 23. The switch 23 also controls the flow of current from the battery B² to the distributing device 11 which causes the firing of the cylinders of the engine 10 in their proper order. The mechanism for varying the speed of the engine 10 of Fig. 3 without breaking the working circuit of the electric machine G² is the same as that shown in Fig. 2. The series starting field winding 26 is connected to the brush 76 of the electric machine G² and the starting switch 29 is connected to the vehicle frame as at 30 so that when the starting circuit is closed at 29 the electric machine G² may be driven as a motor to start the engine 10, mechanically connected to the machine G² by a shaft 12 or other suitable mechanical connections.

A brief description of the operation of the system shown in Fig. 1 will be sufficient to explain the operation of the systems shown in the other two figures. Assuming that the vehicle is stationary and that the engine 10 and electric machine G are also idle, it will first be necessary to start the engine. The switch 23 is closed so that current will be supplied from the battery B to the separately excited field winding 24 and distributer 11. The engine may then be started by closing the switch 29 which allows current to flow from the battery B to the direct current winding of the electric machine G causing the latter to operate as a motor to start the engine. When the engine has come up to speed the switch 29 is opened and the pedal 50 is then operated to close the working circuit of the electric machine G which is now operating as a generator. When the working circuit is closed the motors M, M' will not be able to overcome the generator G and engine 10 driving it since the load on the generator is in no way connected to the field winding 24 and will not cause the latter to build up like shunt or compound wound machines do. The field set up by the winding 24 will remain constant and by throttling the engine the speed of the latter can gradually be increased until the output of the generator G supplying the motors M, M' will be sufficient to start the vehicle. It will thus be seen that the strain on the engine generator and motors with their connected parts will be gradually reduced by eliminating a sudden building up of the field of the generator which I have found causes a severe strain on the driving mechanism.

While I have shown and described my invention in detail I do not wish to be limited to the exact arrangements shown as it will be obvious that numerous changes may be made therein without departing from the spirit of the invention.

Having thus described the invention what I claim and desire to secure by Letters Patent is:

1. In a motor vehicle the combination of a prime mover, an electric machine mechanically connected with the prime mover, a storage battery connected in circuit with said electric machine to be charged thereby when said machine operates as a generator, means whereby current may be supplied to said machine to drive it as a motor to start the prime mover, means for supplying constant flux to said machine, a driving wheel or wheels for the vehicle, an alternating current motor or motors connected to the working circuit of said electric machine and mechanically connected to the driving wheels, and means for varying the speed of the prime mover to vary the speed and current supply of said generator.

2. In a motor vehicle the combination of a prime mover, a double-current electric machine mechanically connected with the prime mover, a storage battery connected in circuit with the direct current winding of said electric machine and adapted to be charged when said machine operates as a generator, means whereby current may be supplied to the direct current winding of said electric machine to drive the same as a motor to start the prime mover, a driving wheel or wheels for the vehicle, an alternating current electric motor or motors connected to the alternating current winding of said electric machine and mechanically connected to the driving wheels, and means for varying the speed of the prime mover without breaking the electrical connection between said electric machine and the driving motor or motors.

3. In a motor vehicle the combination of an internal combustion engine, a double-current electric machine mechanically connected with said engine, a storage battery connected in circuit with the direct current winding of said electric machine and adapted to be charged thereby when said machine operates as a generator, means whereby current may be supplied from said storage battery to the direct current winding of said electric machine to drive said machine as a direct current motor to start the prime mover, a separately excited field winding for said electric machine connected with said battery and adapted to set up a constant field flux for said electric machine, a driving wheel or wheels for the vehicle, an alternating current motor or motors connected to the working circuit leading from the alternating current winding of said electric machine and mechanically connected to the driving wheels, and means for varying the speed of the engine without breaking the electrical connection between said electric machine and the driving motor or motors.

4. In a motor vehicle the combination of a prime mover, an electric machine mechanically connected with the prime mover, a storage battery connected in series with the working circuit of said electric machine, a starting field winding for said electric machine, means for connecting the battery, electric machine and starting field winding in circuit to supply current from the battery to the electric machine to drive the latter as a motor to start the prime mover, a second field winding for said electric machine, means for connecting said second field winding in circuit with the battery so as to set up a constant field flux for said electric machine when it operates as a generator, a driving wheel or wheels for the vehicle, a motor or motors electrically connected to the working circuit of said electric machine and mechanically connected to the driving wheel or wheels, and means for controlling the speed of the engine without breaking the flow of current from the electric machine to the driving motor or motors.

5. In a motor vehicle the combination of a prime mover, an electric machine mechanically connected with the prime mover, a storage battery connected in circuit with said electric machine to be charged thereby when said machine operates as a generator, means whereby current may be supplied to said machine to drive it as a motor to start the prime mover, means for supplying constant flux to said machine, a driving wheel or wheels for the vehicle, an alternating current motor or motors connected to the working circuit of said electric machine and mechanically connected to the driving wheels, and means having a single lever control for making and breaking the electrical connection between said electric machine and motor or motors and for varying and controlling the active power of said prime mover while maintaining the electrical connection.

6. In a motor vehicle the combination with an internal combustion engine, of a double-current electric machine mechanically connected to the shaft of said engine, a storage battery connected in circuit with the direct current winding of said electric machine and adapted to be charged when said machine operates as a generator, an automatic switch for breaking the said connecting circuit of said battery when fully charged and when the electric machine is idle, a switch controlled branch circuit from said battery to the ignition system of the engine and to a field winding of said electric machine to create a constant field flux, means whereby current may be supplied to the direct current winding of said electric machine to drive the same as a motor to start the engine, driving wheels for the vehicle, alternating current electric motors electrically connected to the alternating current winding of the electric machine and mechanically connected to the driving wheels to turn the same, means making and breaking the electrical connection between the electric machine and driving motors, and means for controlling and varying the speed of the engine without breaking or varying said electrical connection to said motors.

In testimony whereof I affix my signature.

JABEA F. SHAWHAN.